United States Patent
Akahori

(10) Patent No.: US 7,362,282 B2
(45) Date of Patent: Apr. 22, 2008

(54) OFDM TRANSMISSION SYSTEM

(75) Inventor: Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/082,852

(22) Filed: Mar. 18, 2005

(65) Prior Publication Data

US 2006/0018248 A1    Jan. 26, 2006

(30) Foreign Application Priority Data

Jul. 12, 2004    (JP) .............................. 2004-205049

(51) Int. Cl.
*H01Q 21/00*    (2006.01)
(52) U.S. Cl. ........................................... 343/844
(58) Field of Classification Search ............... 343/853, 343/893, 810, 844; 324/334
See application file for complete search history.

(56) References Cited

U.S. PATENT DOCUMENTS

| | | | |
|---|---|---|---|
| 3,510,757 A * | 5/1970 | Huston | .................. 324/343 |
| 5,781,436 A * | 7/1998 | Forgang et al. | ................. 702/7 |
| 6,911,824 B2 * | 6/2005 | Bittar | .......................... 324/338 |
| 2002/0191535 A1 | 12/2002 | Sugiyama et al. | |
| 2003/0186726 A1 | 10/2003 | Akita | |
| 2005/0083063 A1 * | 4/2005 | Omeragic et al. | .......... 324/338 |

* cited by examiner

*Primary Examiner*—Huedung Mancuso
(74) *Attorney, Agent, or Firm*—Nixon Peabody LLP; Donald R. Studebaker

(57) ABSTRACT

With the objective of reducing noise components to thereby avoid degradation of receiving characteristics, by making an antenna arrangement having taken into consideration transfer functions for radio wave propagation in an MIMO system, the present invention provides an OFDM transmission system suitable for use between a transmitting device that performs transmission using first and second transmitting antennas and a receiving device that performs reception using first and second receiving antennas, wherein the first transmitting antenna and the second transmitting antenna have an orthogonal relationship with each other and the first receiving antenna and the second receiving antenna have an orthogonal relationship with each other.

2 Claims, 7 Drawing Sheets

OFDM TRANSMISSION SYSTEM

BACKGROUND OF THE INVENTION

1. Field of the Invention

The present invention relates to an orthogonal frequency division multiplexing (hereinafter abbreviated as "OFDM") signal transmission system, and particularly to a layout relationship among antennas employed in an MIMO (Multiple Input Multiple Output) system using a transmitting device provided with a plurality of antennas and a receiving device provided with a plurality of antennas, and a transmission system using the same.

2. Description of the Related Art

FIG. 10 is a block diagram showing the relationship between a transmitting device and a receiving device employed in an MIMO system. The transmitting device 1000 comprises two antennas 1001 and 1002 and transmitters TX1 and TX2. Transmit data T1 is OFDM-modulated by the transmitter TX1, which in turn is transmitted through the antenna 1001 as a transmit signal W1. Further, transmit data T2 is OFDM-modulated by the transmitter TX2, which in turn is transmitted through the antenna 1002 as a transmit signal W2. On the other hand, the receiving device 1010 comprises two antennas 1011 and 1012, receivers RX1 and RX2 and an MIMO computing processor 1013. A signal received by the antenna 1011 is subjected to Fourier transformation or the like in the receiver RX1, which in turn is subjected to demodulation or the like in the MIMO computing processor 1013, so that transmit data is obtained. A signal received by the antenna 1012 is subjected to Fourier transformation or the like in the receiver RX2, which in turn is subjected to demodulation or the like in the MIMO computing processor 1013, so that transmit data is obtained. For the convenience of explanation in this case, the transmitting device 1000 and the receiving device 1010 will be explained assuming that they perform transmission/reception using the two antennas respectively.

Now consider where in FIG. 10, the function of transfer of data from the antenna 1001 to the antenna 1011 is assumed to be a, the function of transfer of data from the antenna 1002 to the antenna 1011 is assumed to be b, the function of transfer of data from the antenna 1001 to the antenna 1012 is assumed to be c, and the function of transfer of data from the antenna 1002 to the antenna 1012 is assumed to be d, respectively. The receiving device 1010 receives receiving signals via the plurality of receiving antennas 1011 and 1012 and extracts necessary signal components from the overlapped received signals, using an inverse matrix of the transfer functions for their propagation paths, respectively. A computing process for extracting the necessary signal components from the overlapped received signals will be explained below.

In a noise-free ideal state, the signals that overlap each other at the receiving antennas respectively satisfy the following equation:

$$\begin{pmatrix} R1 \\ R2 \end{pmatrix} = \begin{pmatrix} a & b \\ c & d \end{pmatrix} \begin{pmatrix} T1 \\ T2 \end{pmatrix} \quad (1)$$

Then, the computing process for extracting the necessary signal components from each of the overlapped signals in the ideal state performs estimation of the transfer functions for radio wave propagation by means of the receiving device through the use of a pilot signal or the like. Next, the following arithmetic operation is performed using estimated values thereof:

$$\begin{pmatrix} T1 \\ T2 \end{pmatrix} = \frac{1}{a*d - b*c} \begin{pmatrix} d & -b \\ -c & a \end{pmatrix} \begin{pmatrix} R1 \\ R2 \end{pmatrix} \quad (2)$$

Since noise components are contained in a signal to be demodulated upon actual communication, the equation (2) is represented as follows. In the following equation, n1 and n2 indicate noise components respectively.

$$\begin{pmatrix} T1' \\ T2' \end{pmatrix} = \frac{1}{a*d - b*c} \begin{pmatrix} d & -b \\ -c & a \end{pmatrix} \begin{pmatrix} R1 + n1 \\ R2 + n2 \end{pmatrix} \quad (3)$$

The following equations are derived from the equations (1) and (3):

$$T1' = T1 + \frac{1}{a*d - b*c}(d*n1 - b*n2) \quad (4)$$

$$T2' = T2 + \frac{1}{a*d - b*c}(-c*n1 - a*n2) \quad (5)$$

In the MIMO system as is understood from the above equations (4) and (5), when the noise is assumed to be a normal distribution, the more the denominator (a*d−b*c) decreases, the more the dependence on the noise components increases, and hence the receiving characteristics are degraded.

Incidentally, a patent document 1 (Japanese Unexamined Patent Publication No. 2002-374224) discloses that in an OFDM signal transmission system, an inverse matrix computation is performed using transfer functions to restore and demodulate a transmit signal.

Also a patent document 2 (Japanese Unexamined Patent Publication No. 2003-244056) discloses a base station which receives receiving signals using an antenna perpendicular to ground and an antenna parallel to ground in a wireless communication system.

However, both the patent documents do not have the aim of arranging antennas considering transfer functions for radio wave propagation in an MIMO system to thereby reduce noise components and avoid degradation of receiving characteristics.

SUMMARY OF THE INVENTION

With the foregoing in view, it is an object of the present invention to reduce noise components and avoid degradation of receiving characteristics by arranging antennas having taken into consideration transfer functions for radio wave propagation in an MIMO system.

According to one aspect of the present invention, for achieving the above object, there is provided an OFDM transmission system suitable for use between transmitters that perform transmission using first and second transmitting antennas and receivers that perform reception using first and second receiving antennas, wherein the first transmitting antenna and the second transmitting antenna have an orthogonal relationship with each other, and the first receiving antenna and the second receiving antenna have an orthogonal relationship with each other.

According to the OFDM transmission system, it is possible to reduce noise components and avoid degradation of receiving characteristics.

The above and further objects and novel features of the invention will more fully appear from the following detailed description appended claims and the accompanying drawings.

DETAILED DESCRIPTION OF THE PREFERRED EMBODIMENTS

OFDM transmission systems of the present invention will hereinafter be described with reference to the accompanying drawings.

First Preferred Embodiment

Figure 2:
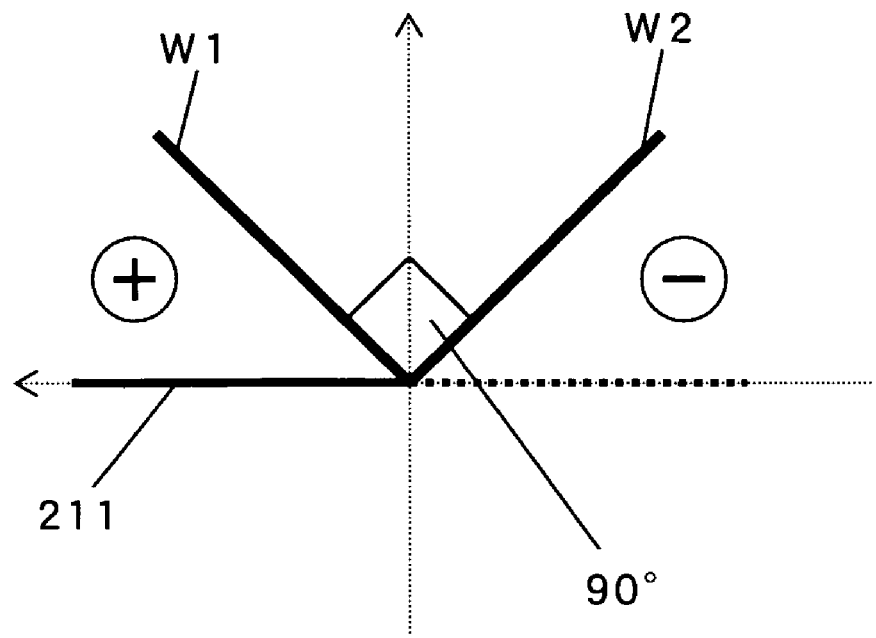
FIG. 2 is a block diagram showing a polarity relationship between transmit signals and a first receiving antenna employed in the first embodiment.
Figure 3:
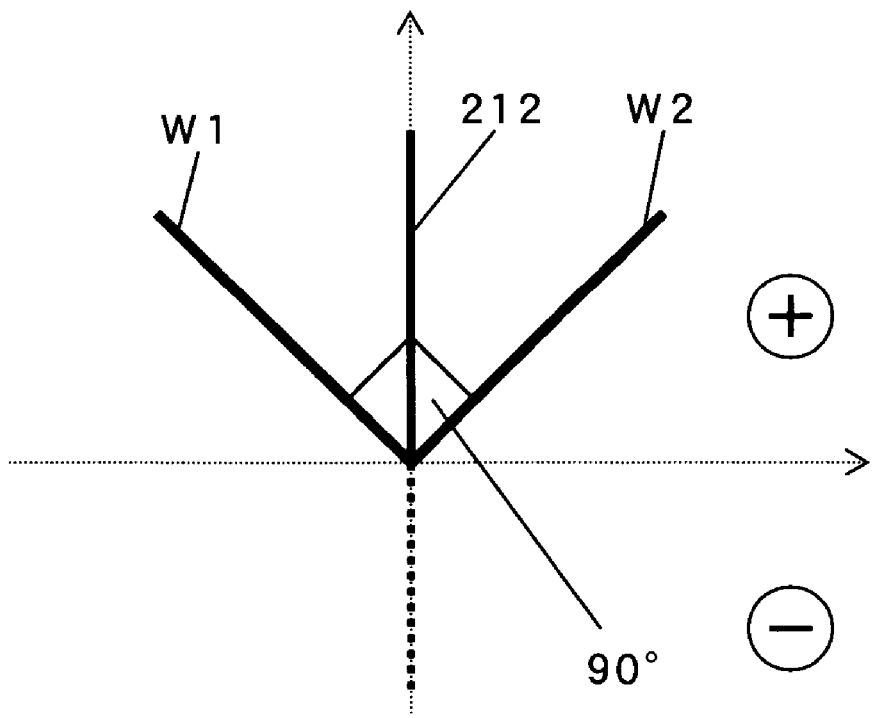
FIG. 3 is a block diagram illustrating a polarity relationship between transmit signals and a second receiving antenna employed in the first embodiment.

An OFDM transmission system according to a first embodiment of the present invention will first be explained using FIGS. 1 through 3.

Figure 1:
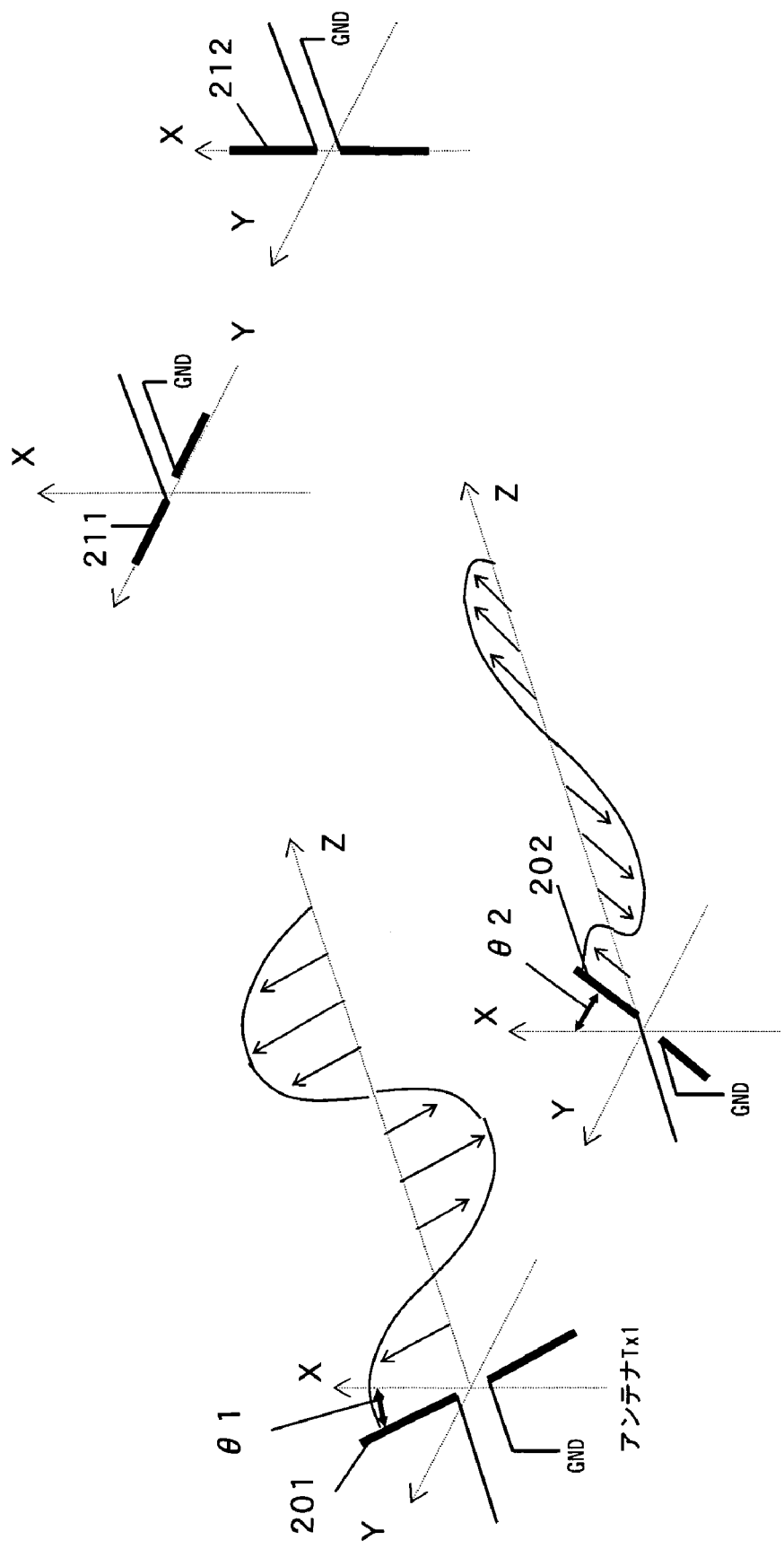
FIG. 1 is a block diagram for describing a layout relationship among transmitting antennas and receiving antennas employed in a first embodiment of the present invention.

FIG. 1 is a block diagram for describing a layout relationship among transmitting antennas and receiving antennas employed in the first embodiment of the present invention. In the OFDM transmission system according to the first embodiment of the present invention, a transmitting device is provided with two transmitting antennas 201 and 202. The transmitting antenna 201 extends in positive directions of an imaginary X axis and an imaginary Y axis on an imaginary X-Y plane and has an angle θ1 made with respect to the imaginary X axis. The transmitting antenna 201 transmits a transmit signal having a COS θ waveform. The transmitting antenna 202 extends in a positive direction of an imaginary X axis and a negative direction of an imaginary Y axis and has an angle θ2 made with respect to the imaginary X axis. The transmitting antenna 202 transmits a transmit signal having a COS θ waveform. Now, the two transmitting antennas 201 and 202 form an orthogonal relationship with each other. That is, they have a relationship of θ1+θ2=90°. When θ1 is 45°, for example, θ2 is also 45°. It is needless to say that although each of the transmitting antennas 201 and 202 sends the transmit signal having the COS θ waveform in the present embodiment, it may transmit a transmit signal having a Sinθ waveform. On the other hand, a receiving device is provided with two receiving antennas 211 and 212. The receiving antenna 211 is placed on an imaginary X-Y plane and located on an imaginary Y axis extending in a positive direction. The receiving antenna 212 is placed on an imaginary X-Y plane and located on an imaginary X axis extending in a positive direction. Now, the two receiving antennas 211 and 212 form an orthogonal relationship with each other.

In the present invention, the transmitting antennas 201 and 202 having the orthogonal relationship, and the receiving antennas 211 and 212 having the orthogonal relationship respectively have an offset of 45°. In other words, the transmitting antenna 201 has an angle of 45° with respect to the receiving antenna 211. Further, the transmitting antenna 202 has an angle of 45° with respect to the receiving antenna 212.

A polarity relationship between the transmit signals and receiving antennas will be described below using FIGS. 2 and 3. FIGS. 2 and 3 are diagrams showing the receiving device as viewed from the transmitting device. FIG. 2 is a block diagram showing a polarity relationship between a transmit signal W1 outputted from the transmitting antenna 201 and the receiving antenna 211, and a polarity relationship between a transmit signal W2 outputted from the transmitting antenna 202 and the receiving antenna 211. FIG. 3 is a block diagram showing a polarity relationship between a transmit signal W1 outputted from the transmitting antenna 201 and the receiving antenna 212 and a polarity relationship between a transmit signal W2 outputted from the transmitting antenna 202 and the receiving antenna 212.

Now consider where the polarity of an electric field of the transmit signal W1 transmitted from the transmitting antenna 201, which is received at the receiving antenna 211, is assumed to be plus. In other words, the distance from the receiving antenna 211 to the transmitting antenna 201 is equivalent to the distance equal to an integral multiple of the radio frequency transmitted from the transmitting antenna 201 in FIG. 1. In this case, the polarity of an electric field of the transmit signal W2 transmitted from the transmitting antenna 202, which is received at the receiving antenna 211, is minus as shown in FIG. 2. Similarly, as shown in FIG. 3, the polarity of an electric field of the transmit signal W1 sent from the transmitting antenna 201, which is received at the receiving antenna 212, is plus, whereas the polarity of an electric field of the transmit signal W2 transmitted from the transmitting antenna 202, which is received at the receiving antenna 212, is plus. Thus, only the electric field of the transmit signal W2 sent from the transmitting antenna 202, which is received at the receiving antenna 211, becomes minus. That is, only a transfer function $\underline{b}$ of transfer functions a through d has polarity different from other transfer functions a, c and d. When the transfer function b is of negative polarity, other transfer functions a, c and d are respectively brought to positive polarity. On the other hand, when the transfer function b is of positive polarity, other transfer functions a, c and d reach the negative polarity. When the transfer function b is of the negative polarity and other transfer functions a, c and d are respectively of the positive polarity, a*d−b*c is represented as a*d+b*c. Thus, the value of the denominator (a*d−b*c) becomes large in the equations (4) and (5). That is, when the value of the denominator (a*d−b*c) increases, the value of $$\frac{1}{a*d - b*c}(d*n1 - b*n2)$$

in the equation (4) becomes small. Similarly, when the value of the denominator (a*d−b*c) becomes large, the value of $$\frac{1}{a*d - b*c}(-c*n1 - a*n2)$$

in the equation (5) decreases. Incidentally, when the transfer function b is of the positive polarity and other transfer functions a, c and d are respectively of the negative polarity, a*d−b*c is represented as −a*d−b*c=−(a*d+b*c). Thus, even in this case, the denominator (a*d+b*c) also increases. It is needless to say that although the polarity of the denominator is brought to the negative polarity in this case, the denominator's number may become large and hence no problem occurs.

According to the OFDM transmission system showing the first embodiment of the present invention, the value of a*d−b*c increases even in line-of-sight propagation less subject to a multipath and the influence of noise can be reduced. Thus, according to the OFDM transmission system showing the first embodiment of the present invention, an improvement in receiving characteristic is obtained.

Incidentally, it is needless to say that although the numbers of the transmitting antennas and the receiving antennas are two respectively, they may be three or more respectively.

Second Preferred Embodiment

Figure 4:
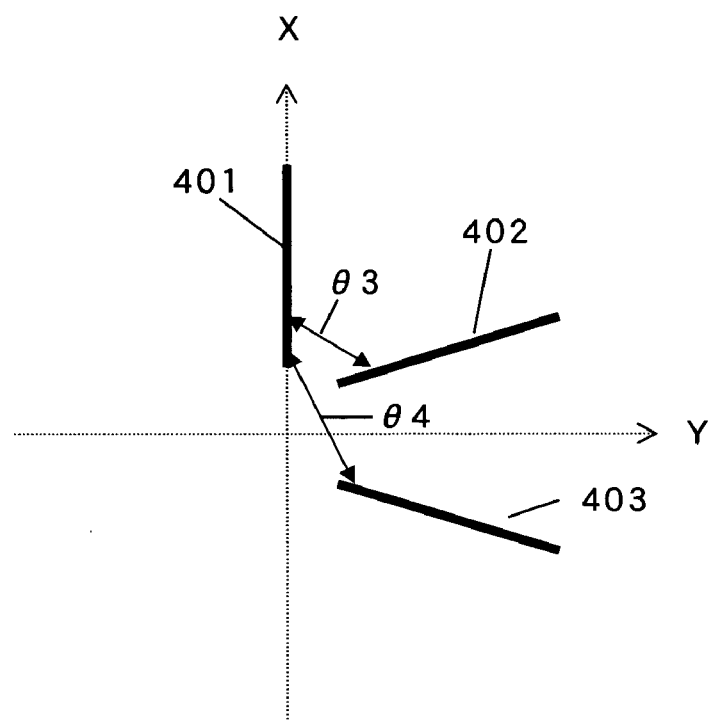
FIG. 4 is a block diagram for describing a layout relationship among transmitting antennas in their entirety, which are employed in a second embodiment of the present invention.
Figure 6:
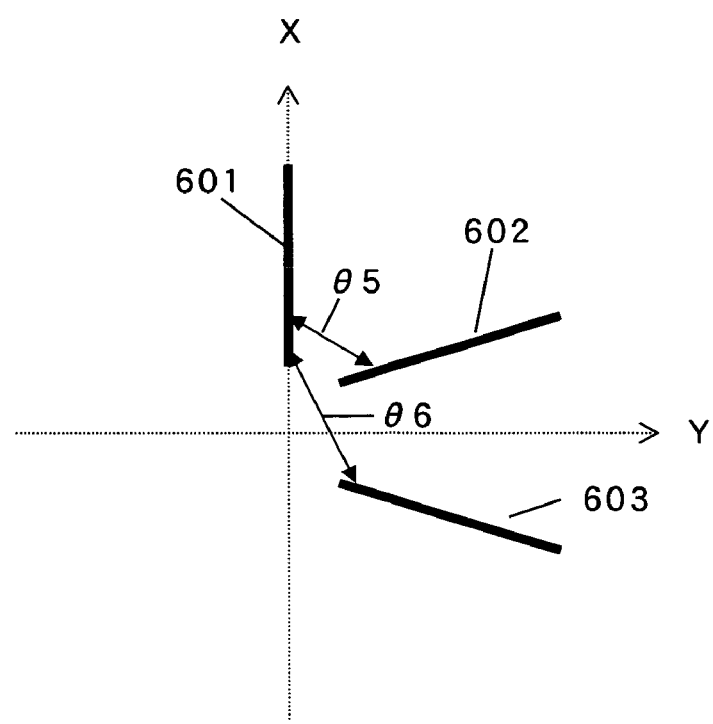
FIG. 6 is a block diagram for describing a layout relationship among receiving antennas in their entirety, which are employed in the second embodiment of the present invention.
Figure 5:
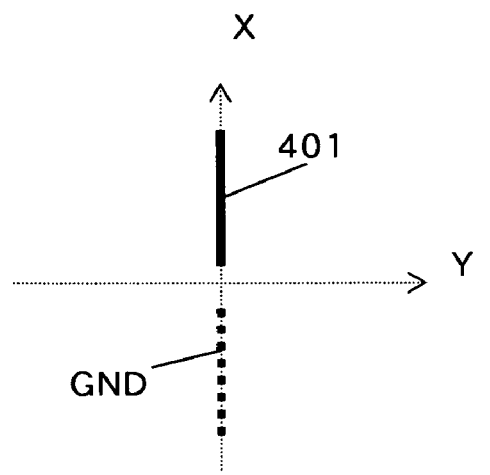
FIG. 5 is a block diagram for describing a layout relationship among the individual transmitting antennas employed in the second embodiment of the present invention.
Figure 5:
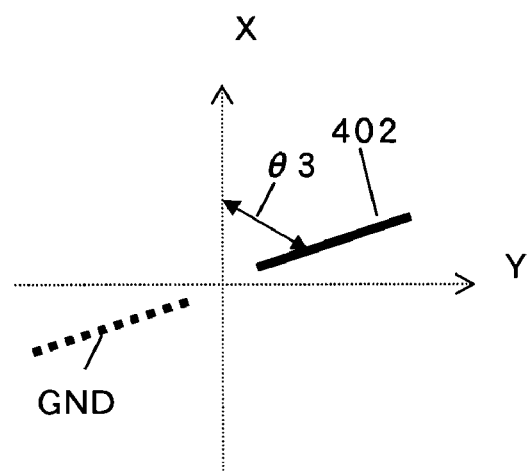
Figure 5:
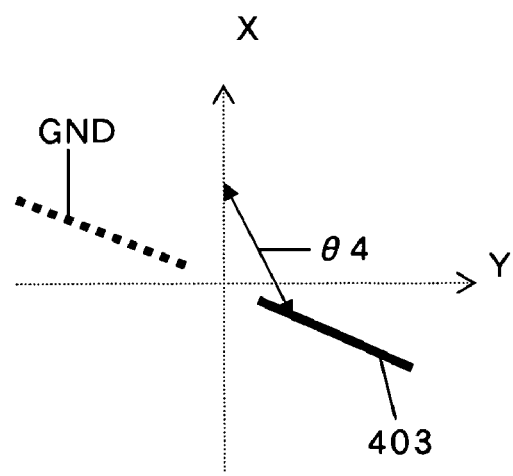
Figure 7:
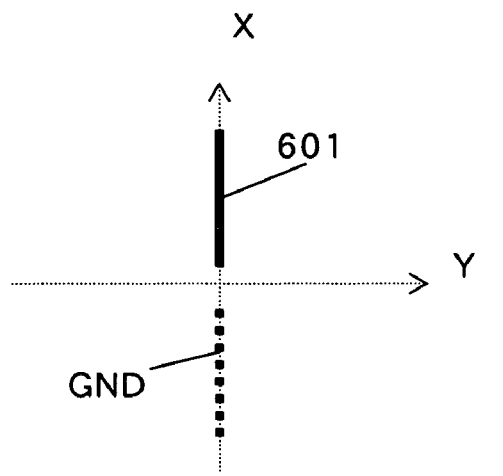
FIG. 7 is a block diagram for describing a layout relationship among the individual receiving antennas employed in the second embodiment of the present invention.
Figure 7:
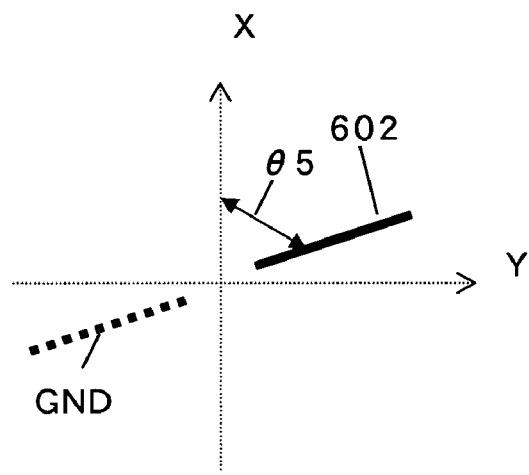
Figure 7:
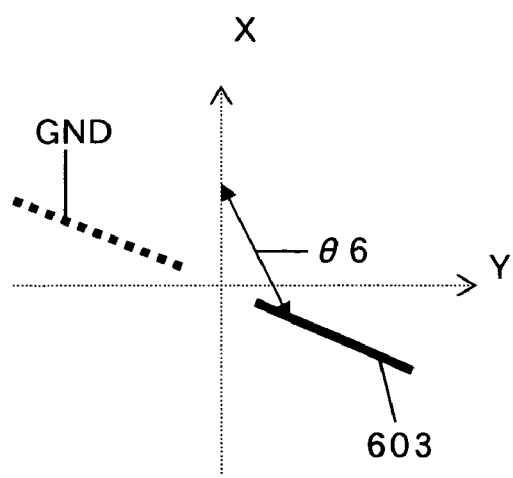

An OFDM transmission system according to a second embodiment of the present invention will next be described using FIGS. 4 through 6. FIG. 4 is a block diagram for describing a layout relationship among transmitting antennas in their entirety, which are employed in the second embodiment of the present invention. FIG. 5 is a block diagram for describing a layout relationship among the individual transmitting antennas employed in the second embodiment of the present invention. FIG. 6 is a block diagram for describing a layout relationship among receiving antennas in their entirety, which are employed in the second embodiment of the present invention. FIG. 7 is a block diagram for describing a layout relationship among the individual receiving antennas employed in the second embodiment of the present invention.

In the OFDM transmission system according to the second embodiment of the present invention, a transmitting device is provided with three transmitting antennas 401 through 403. As shown in FIGS. 4 and 5, the transmitting antenna 401 is placed on an imaginary X-Y plane and located on an imaginary X axis extending in a positive direction. Similarly, the transmitting antenna 402 extends in a positive direction of an imaginary Y axis on the imaginary X-Y plane and has an angle θ3 made with respect to the imaginary X axis. The transmitting antenna 403 extends in a negative direction of the imaginary X axis on the imaginary X-Y plane and has an angle θ4 made with respect to the imaginary X axis. For convenience of explanation in the present embodiment, they have a relationship of θ3=60° and θ4=120°. On the other hand, in the OFDM transmission system according to the second embodiment of the present invention, a receiving device is provided with three receiving antennas 601 through 603. As shown in FIGS. 6 and 7, the receiving antenna 601 is placed on an imaginary X-Y plane and located on an imaginary X axis extending in a positive direction. Similarly, the receiving antenna 602 extends in a positive direction of an imaginary Y axis on the imaginary X-Y plane and has an angle θ5 made with respect to the imaginary X axis. The receiving antenna 603 extends in a negative direction of the imaginary X axis on the imaginary X-Y plane and has an angle θ6 made with respect to the imaginary X axis. For convenience of explanation in the present embodiment, they have a relationship of θ5=60° and θ6=120°. In other words, the OFDM transmission system according to the second embodiment of the present invention is placed in a relationship in which two-dimensional spaces are allocated according to the number of the transmitting antennas and the number of the receiving antennas, and they have angular differences different from one another.

Advantageous effects of the OFDM transmission system according to the second embodiment of the present invention, which has been configured as described above, will be explained below.

Now consider where for convenience of explanation, the distances among a plurality of transmitting antennas and a plurality of receiving antennas are the same and the radio wave propagation of only a line-of-sight direct wave a is carried out. In doing so, transfer functions for radio wave propagation, which exist among a plurality of transmitting antennas and a plurality of receiving antennas employed in a conventional OFDM transmission system, are expressed in the following equation:

$$\begin{pmatrix} a & a & a & a \\ a & a & a & a \\ a & a & a & a \\ a & a & a & a \end{pmatrix} \quad (6)$$

Here, it is necessary that the inverse matrix of the equation (6) exists as expressed in the equation (2) in order to obtain a transmit signal at the receiving device. There is generally provided the condition that a determinant is not 0 (zero) in a matrix with 3 rows and 3 columns (generally called "Sarrus theorem"). Determining the determinant of the equation (6) using the present theorem yields an equation expressed as follows:

$$\begin{vmatrix} a & a & a \\ a & a & a \\ a & a & a \end{vmatrix} = a^3 + a^3 + a^3 - a^3 - a^3 - a^3 = 0 \quad (7)$$

As is understood from the equation (7), no inverse matrix exists in the equation (6). Thus, the conventional OFDM transmission system is not capable of performing satisfactory reception.

Next, transfer functions for radio wave propagation, which exist among the plurality of transmitting antennas and the plurality of receiving antennas employed in the OFDM transmission system according to the second embodiment are expressed as follows. For convenience of explanation, now consider where antenna receiving power relates to angles or tilt angles (each corresponding to the difference between the angles of transmitting and receiving antennas with respect to the ground) of each transmitting antenna and each receiving antenna, and when the angle of each of the transmitting and receiving antennas is expressed in θ, the receiving power is proportional to cos θ. However, actual antennas are different in this relation due to their structures.

$$\begin{pmatrix} a*\cos 0 & a*\cos\frac{\pi}{3} & a*\cos\frac{2\pi}{3} \\ a*\cos\frac{-\pi}{3} & a*\cos 0 & a*\cos\frac{\pi}{3} \\ a*\cos\frac{2\pi}{3} & a*\cos\frac{-\pi}{3} & a*\cos 0 \end{pmatrix} = \begin{pmatrix} a & \frac{a\sqrt{3}}{2} & \frac{-a\sqrt{3}}{2} \\ \frac{a\sqrt{3}}{2} & a & \frac{a\sqrt{3}}{2} \\ \frac{-a\sqrt{3}}{2} & \frac{a\sqrt{3}}{2} & a \end{pmatrix} \quad (8)$$

Determining a determinant of the equation (8) using the Sarrus theorem yields an equation expressed as follows:

$$\begin{vmatrix} a & \frac{a\sqrt{3}}{2} & \frac{-a\sqrt{3}}{2} \\ \frac{a\sqrt{3}}{2} & a & \frac{a\sqrt{3}}{2} \\ \frac{-a\sqrt{3}}{2} & \frac{a\sqrt{3}}{2} & a \end{vmatrix} = \quad (9)$$

$$a^3 + \left(\frac{a\sqrt{3}}{2} \times \frac{a\sqrt{3}}{2} \times \frac{-a\sqrt{3}}{2}\right) + \left(\frac{a\sqrt{3}}{2} \times \frac{a\sqrt{3}}{2} \times \frac{-a\sqrt{3}}{2}\right) -$$

$$\left(\frac{-a\sqrt{3}}{2} \times a \times \frac{-a\sqrt{3}}{2}\right) - \left(\frac{a\sqrt{3}}{2} \times \frac{a\sqrt{3}}{2} \times a\right) -$$

$$\left(\frac{3\sqrt{3}}{2} \times \frac{a\sqrt{3}}{2} \times a\right) =$$

$$a^3 + \frac{-3a^3\sqrt{3}}{8} + \frac{-3a^3\sqrt{3}}{8} + \frac{3a^3}{4} - \frac{3a^3}{4} - \frac{3a^3}{4} = \frac{-7 - 3\sqrt{3}}{4}a^3$$

Since the equation (9) is not brought to zero, an inverse matrix exists in the equation (8). Thus, since the inverse matrix exists in the matrix based on the transfer functions, the OFDM transmission system according to the second embodiment of the present invention is capable of performing demodulation and obtaining satisfactory reception.

Third Preferred Embodiment

Figure 8:
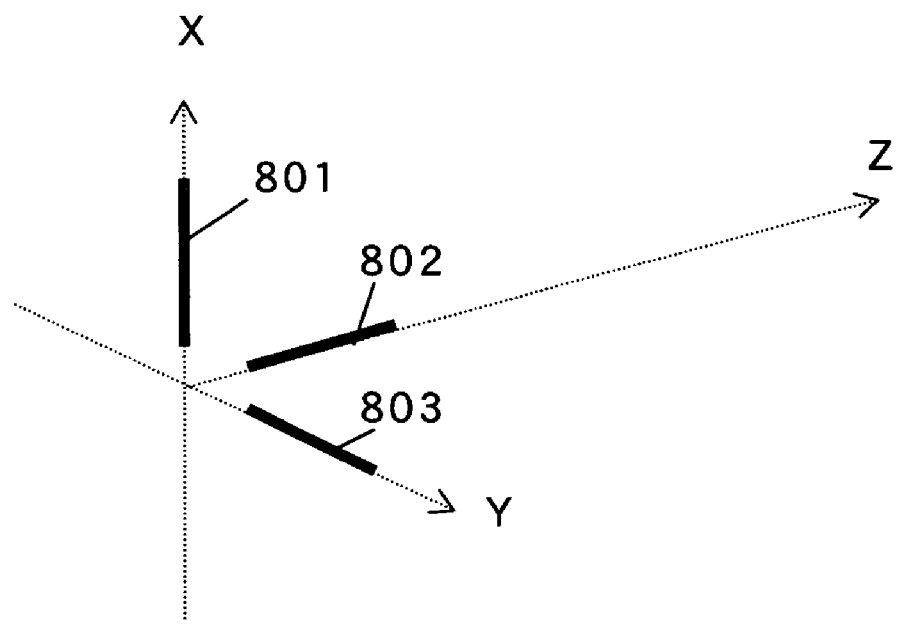
FIG. 8 is a block diagram for describing a layout relationship among transmitting antennas in their entirety, which are employed in a third embodiment of the present invention.

An OFDM transmission system according to a third embodiment of the present invention will next be explained using FIG. 8. FIG. 8 is a block diagram for describing a layout relationship among transmitting antennas in their entirety, which are employed in the third embodiment of the present invention.

In the OFDM transmission system according to the third embodiment of the present invention, a transmitting device is provided with three transmitting antennas 801 through 803. As shown in FIG. 8, the transmitting antenna 801 is located on an imaginary X axis. The transmitting antenna 802 is located on an imaginary Z axis. The transmitting antenna 803 is located on an imaginary Y axis. That is, in the OFDM transmission system according to the third embodiment, the respective antennas are placed in a three-dimensional layout relationship and orthogonal to one another.

According to the OFDM transmission system showing the third embodiment of the present invention, different transfer functions for radio wave propagation can be obtained even in line-of-sight propagation less subject to a multipath and an improvement in receiving characteristic is obtained.

Incidentally, it is needless to say that the above configuration may be applied to receiving antennas. Even in this case, the above advantageous effects are brought about.

Fourth Preferred Embodiment

Figure 9:
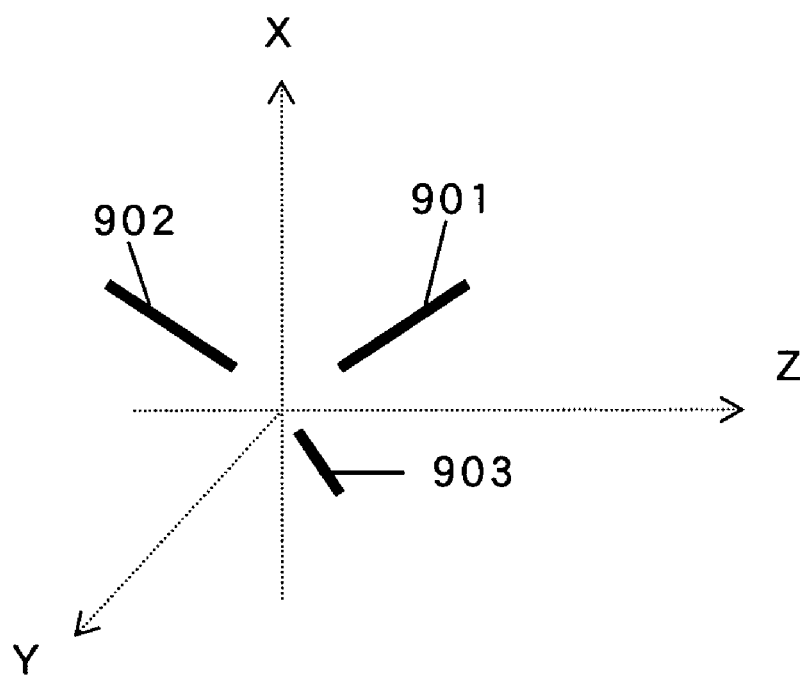
FIG. 9 is a block diagram for describing a layout relationship among transmitting antennas in their entirety, which are employed in a fourth embodiment of the present invention.
Figure 10:
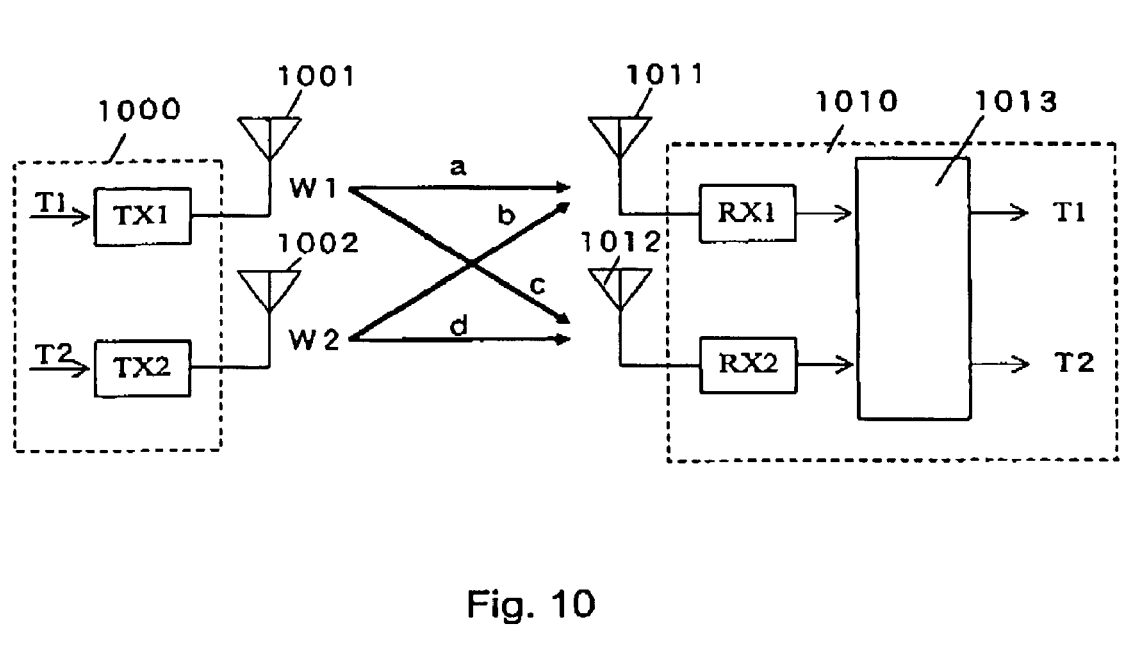
FIG. 10 is a block diagram showing the relationship between a transmitting device and a receiving device employed in an MIMO system.

An OFDM transmission system according to a fourth embodiment of the present invention will next be descried using FIG. 9. FIG. 9 is a block diagram for describing a layout relationship among transmitting antennas in their entirety, which are employed in the fourth embodiment of the present invention.

In the OFDM transmission system according to the fourth embodiment of the present invention, a transmitting device is equipped with three transmitting antennas 901 through 903. As shown in FIG. 9, a leading end of the transmitting antenna 901 is placed on an imaginary X-Z plane and oriented in its corresponding positive directions of imaginary X and Y axes. A leading end of the transmitting antenna 902 is placed on an imaginary X-Y plane and oriented in its corresponding positive directions of the imaginary X axis and an imaginary Y axis. A leading end of the transmitting antenna 903 is placed on an imaginary X-Y-Z plane and oriented in its corresponding positive directions of the imaginary X axis and imaginary Y axis and imaginary Z axis. In other words, the OFDM transmission system according to the fourth embodiment of the present invention is placed in a relationship in which space is allocated three-dimensionally and the allocated spaces have angular differences different from one another.

According to the OFDM transmission system showing the fourth embodiment of the present invention, different transfer functions for radio wave propagation can be obtained even in line-of-sight propagation less subject to a multipath and an improvement in receiving characteristic is obtained.

Incidentally, it is needless to say that the above configuration may be applied to receiving antennas. Even in this case, the above advantageous effects are brought about.

While the preferred forms of the present invention have been described, it is to be understood that modifications will be apparent to those skilled in the art without departing from the spirit of the invention. The scope of the invention is to be determined solely by the following claims.

What is claimed is:

1. An OFDM transmission system suitable for use between a transmitting device and a receiving device, comprising:

said transmitting device which performs transmission of an OFDM signal using a plurality of transmitting antennas; and said receiving device which performs reception of an OFDM signal using a plurality of receiving antennas, wherein the plurality of transmitting antennas are respectively placed in a two-dimensional space and different from other transmitting antennas in terms of angles as viewed from ground, and the plurality of receiving antennas are respectively placed in a two-dimensional space and different from other receiving antennas in terms of angles as viewed from ground.

2. An OFDM transmission system suitable for use between a transmitting device and a receiving device, comprising:

said transmitting device which performs transmission of an OFDM signal using a plurality of transmitting antennas; and said receiving device which performs reception of an OFDM signal using a plurality of receiving antennas, wherein the plurality of transmitting antennas are respectively placed in a three-dimensional space and different from other transmitting antennas in terms of angles as viewed from ground, and the plurality of receiving antennas are respectively placed in a three-dimensional space and different from other receiving antennas in terms of angles as viewed from ground.

* * * * *